April 30, 1968  J. E. CUNNINGHAM  3,380,144
DYNAMIC ALIGNMENT DEVICE FOR RING AND TRAVELER
TYPE WINDING APPARATUS
Filed April 8, 1966  2 Sheets-Sheet 2
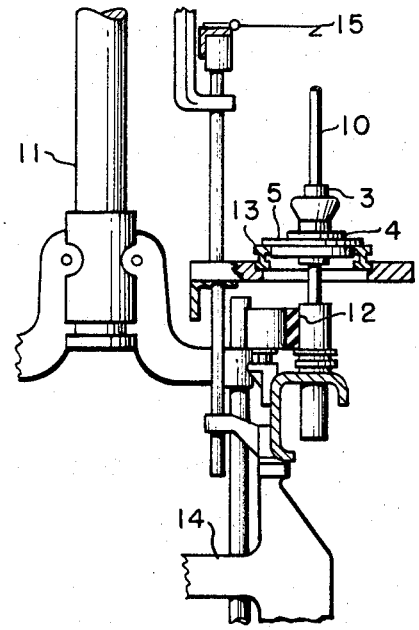
FIG.-3-
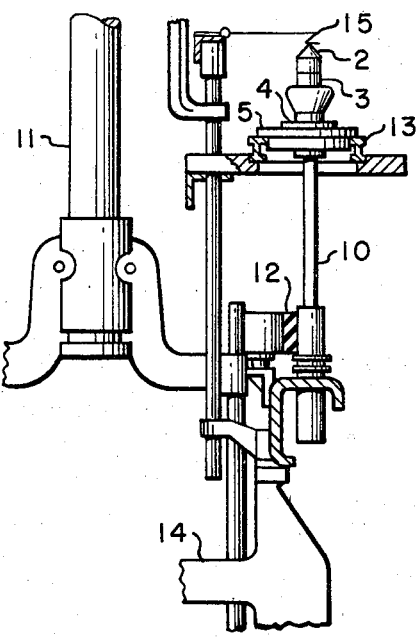
FIG.-4-
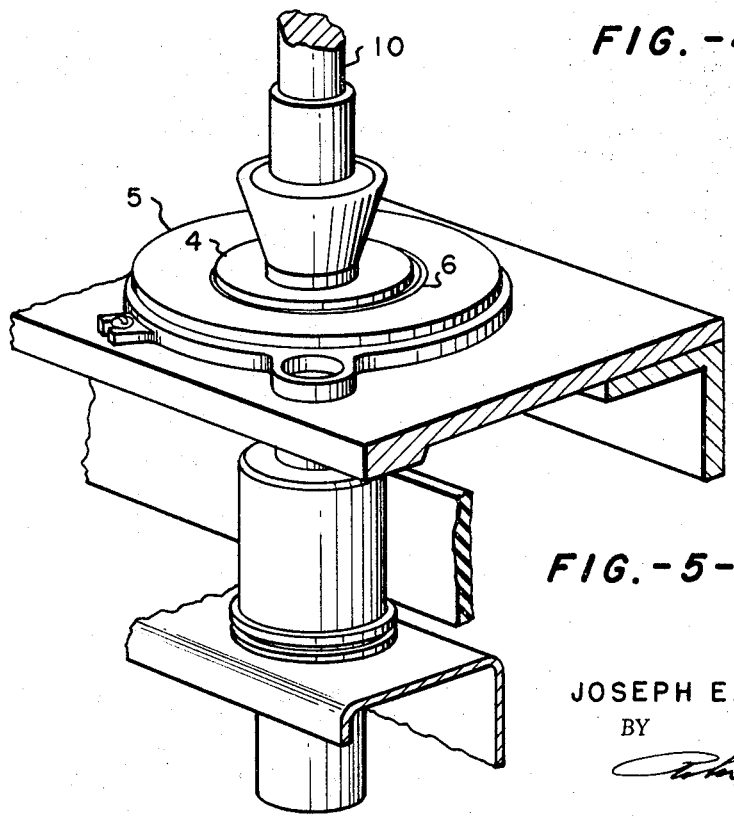
FIG.-5-
INVENTOR.
JOSEPH E. CUNNINGHAM
BY
ATTORNEY

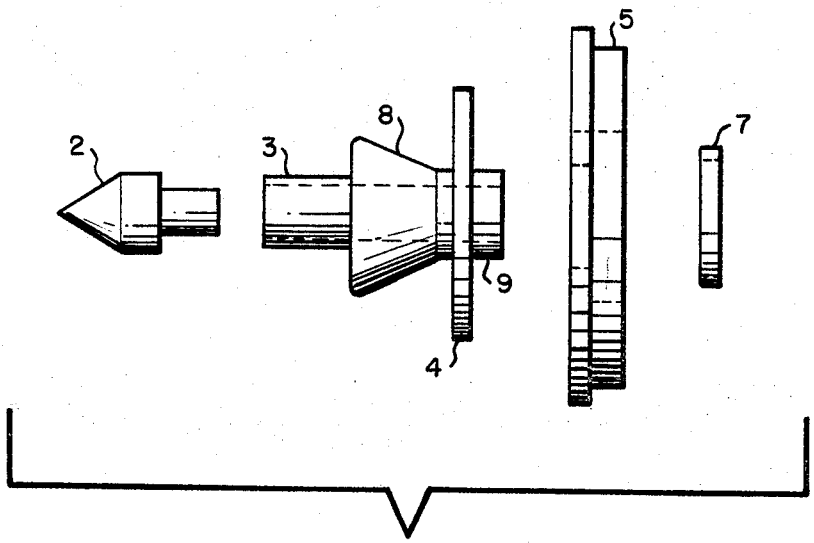
FIG.-1-
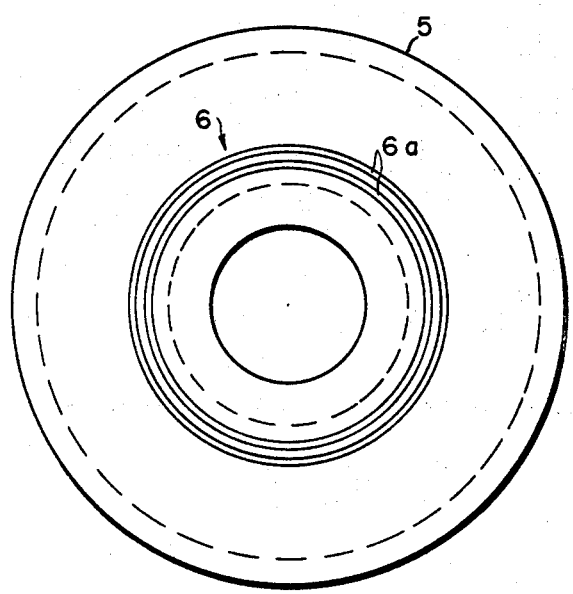
FIG.-2-

United States Patent Office 3,380,144
Patented Apr. 30, 1968

3,380,144
DYNAMIC ALIGNMENT DEVICE FOR RING AND TRAVELER TYPE WINDING APPARATUS
Joseph E. Cunningham, Eckhart, Md., assignor to Celanese Corporation of America, New York, N.Y., a corporation of Delaware
Filed Apr. 8, 1966, Ser. No. 541,254
10 Claims. (Cl. 29—407)

This invention relates to a dynamic alignment device and more specifically to a device for the dynamic alignment of a winding device of the ring and traveler type.

Winding devices of the ring and traveler type are commonly provided with static alignment tools. While static alignment tools are, of course, functional devices, the decision as to whether or not realignment is required is a matter of judgment on the part of the individual utilizing the static alignment tool. In the production of yarns and especially man-made fiber yarns, the same degree of uniformity of alignment must be present in all of the spindles employed on a winding device, such as for instance a downtwister frame, or the required degree of uniformity in the end product cannot be obtained. Where the decision to realign is based upon the discretion of the individual operating a static alignment tool, it is obvious that uniformity in setting will be difficult to obtain. The use of a static alignment tool is further complicated by the fact that static alignment tools are not satisfactory for centering balloon guides with the spindles, a separate piece of equipment being necessary for this alignment. Static alignment is also undesirable in that there is a question as to whether the alignment of rings, spindles and balloon guides will be the same on rotating spindles as on the pre-set stationary spindles.

It is, therefore, an object of this invention to provide a device for the dynamic alignment of winding devices of the ring and traveler type.

It is an additional object of this invention to provide a device for dynamic alignment of winding devices of the ring and traveler type which will also align balloon guides with spindles.

It is a further object of this invention to provide a device for the dynamic alignment of winding devices of the ring and traveler type wherein the decision to realign is not based on the judgment of the operator.

It is another object of this invention to provide a process for the dynamic alignment of winding devices of the ring and traveler type.

All of the objects of the present invention are more fully set forth herein with reference to the accompanying drawings wherein:

FIGURE 1 is an exploded side view of the dynamic alignment device of this invention.

FIGURE 2 is a top view of the disc member of the dynamic alignment device of this invention.

FIGURE 3 is a partially cross sectioned side view of the dynamic alignment device of this invention, being employed when the ring and traveler of the downtwister is at the bottom of the traverse stroke.

FIGURE 4 is a partially cross sectioned side view of the dynamic alignment device of this invention, being employed to center the balloon guide with the spindle when the ring of the downtwister is at the top of the traverse stroke.

FIGURE 5 is a perspective view of the dynamic alignment device of this invention showing a ring out of alignment with the spindle.

The apparatus of the present invention provides means for dynamically achieving the following:

(1) Centering rings to spindles at the bottom of the traverse stroke.

(2) Checking alignment of spindles to rings at the top of the traverse stroke.
(3) Checking alignment of balloon guides to spindles.
(4) Detecting bent spindles.

It should be understood that each of the foregoing are achieved by means of a reading on the dynamic alignment device and that the decision to realign is in no way dependent upon the operator's judgment.

Referring now to the drawings, the apparatus set forth in FIGURES 1 and 2 illustrates the various components making up the dynamic alignment device of this invention, the dynamic alignment device 1 comprising a centering indicator 2 which is axially press fit into sleeve member 3, sleeve member 3 having a flange member 4 near its terminal portion. Sleeve member 3 is designed so as to fit snugly upon spindle assemblies, the dimensions of sleeve member 3 can, of course, be adjusted according to the diameters of the spindle members being employed. It is preferred that sleeve member 3 carry a centrally located annular projection 8 in order to aid an operator in installation and removal of the dynamic alignment device. Disc member 5 is positioned beneath flange member 4 of sleeve member 3, disc member 5 having an axial orifice of greater diameter than the terminal outside diameter of sleeve member 3, but a lesser diameter than the outside diameter of flange member 4. Disc member 5 is preferably flanged so as to fit easily within the ring in a ring and traveler winding device. Disc member 5 carries groove members 6 on its upper face and is secured to terminal portion 9 of sleeve member 3 in a manner so as to produce free play by means of retaining ring 7. Retaining ring 7 is equipped with a set screw by means of which retaining ring 7 can be secured to the terminal portion 9 of sleeve member 3. The innermost circular groove 6a of groove member 6 disposed on the upper face of disc member 5 must have a diameter which is greater than the diameter of flange member 4 but sufficiently small so as to allow flange member 4 to cover a substantial portion of the innermost groove member 6a when disc member 5 is in an off center position.

It should be understood that the dynamic alignment device of this invention is satisfactory for use with any ring and traveler winding devices and especially ring and traveler downtwisters. Representative types of equipment for which the device of this invention is suitable are the ring and traveler downtwisters manufactured by Whitin Machine Works of Whitinsville, Mass., Saco-Lowell of Greenville, S.C. (Division of Maremont Corp.), United States Textile Machine Co. of Scranton, Pa., and Universal Winding Co. of Providence, R.I. The exact positioning of the dynamic alignment device of this invention with regard to a downtwister will be more apparent from a discussion of FIGURES 3 and 4. In FIGURE 3 a conventional yarn twister spindle 10 is mounted on frame member 11 for rotation by a belt 12, ring 13 is mounted for vertical reciprocation on the frame as indicated at 14, and a conventional balloon guide 15 is provided. The usual traveler which is not illustrated is engaged with the traveler ring 13 to apply the desired tension to the yarn as it is fed by feed means to such bobbins as are mounted on spindle 10. As the traveler interferes with proper seating of the dynamic alignment device, it is desirable to remove the traveler before alignment tests are conducted. Ring 13 which, in FIGURE 3 of the drawings, is at the bottom of the traverse cycle is partially broken so as to permit a better view of the dynamic alignment device of this invention. As may be seen, disc member 5 is fitted within ring 13, disc member 5 being so mounted as to allow for substantially free movement of flanged sleeve member 3 which is in frictional contact with spindle 10. As ring member 13 is at the bottom of the traverse cycle pointer member 2 is not employed in the assembly of the dynamic alignment device. Turning to the perspective view in FIGURE 5, there can be seen that only one of the two circular groove members 6 disposed on the face of marker member 5 is visible, an indication that the ring member 13 is out of alignment and satisfactory adjustments must be made by means of such compensating devices as are employed in all ring and spindle downtwisters. When ring member 13 is properly aligned, it will be found that both circular grooves 6 disposed on the face of disc member 5 will be visible.

In order to determine the alignment of the spindle as well as the alignment of the balloon guide, ring 13 must be at the top of the traverse cycle, a position which is indicated in FIGURE 4 of the drawings. In FIGURE 4 ring 13 is cross sectioned so as to provide a view of the dynamic alignment device. As may be seen in FIGURE 4, disc member 5 is positioned within ring 13, disc member 5 being so mounted as to allow for substantially free movement of flanged sleeve member 3, flanged sleeve member 3 being press fitted on spindle member 10. As ring member 13 is at the top of the traverse cycle, pointer member 2 is also included in the dynamic alignment assembly, pointer member 2 being press fitted to flanged sleeve member 3. As can be seen from FIGURE 4 of the drawings, pointer member 2 is aligned with balloon guide member 15 and therefore balloon guide 15 is in proper position. Should the pointer and balloon guide not align, proper adjustments could, of course, be made. The alignment of spindle member 10 is, of course, again determined by a viewing of circular grooves 6 disposed in the face of marker member 5, a view of both circular grooves 6 indicating that spindle 10 is in an aligned position while a complete view of only one of grooves 6 indicating that spindle 10 is out of alignment.

As is readily apparent should an alignment of ring member 13 at the bottom of the traverse cycle as is illustrated in FIGURE 3 of the drawings result in a misalignment of spindle member 10 when ring member 13 is at the top of the traverse cycle as illustrated in FIGURE 4 of the drawings, or conversely, should the alignment at the top of the traverse cycle result in a mis-alignment at the bottom of the traverse cycle, a detection is thereby made of a bent spindle member 10.

While any type of durable construction material may be employed in manufacturing the dynamic alignment device of this invention, brass, aluminum and fiber board have been found to be especially satisfactory. The selection of brass, aluminum and fiber board is primarily due to the ease of machineability. The disc member carrying circular grooves on its face should be prepared from a material which will permit the circular grooves to remain bright and easily visible to the operator. Grooves are, of course, preferred in order to prevent the markings from being abraded away, however, any type of durable marking system is satisfactory for purposes of this invention.

In practice, it has been found that the dynamic alignment device of this invention not only provides a superior end product due to the superior alignment obtained but also provides valuable economies in times spent in procuring the alignment. It should also be understood that while the dynamic alignment device of this invention has been specifically disclosed with reference to ring and traveler downtwisters that the device is also adaptable to other types of winding equipment of the ring and traveler type such as for instance, extrusion metier winding equipment and doubling machines.

Having thus disclosed the invention, what is claimed is:

1. In a ring and traveler winding device a dynamic alignment apparatus for aligning spindles, rings and balloon guides, said device comprising a flanged sleeve member adapted to be axially and rotatably mounted on said spindle and a ring fitted disc having markings disposed thereon, said markings being designed to be obscured by said flanged sleeve member when said spindle is out of alignment.

2. The apparatus of claim 1 wherein a pointer member is superimposed on said bushing member.

3. The apparatus of claim 1 wherein said sleeve member carries a centrally located annular projection whereby handling of said dynamic alignment apparatus is facilitated.

4. The apparatus of claim 1 wherein said markings are circular grooves axially disposed on the upper face of said disc member.

5. The apparatus of claim 1 wherein said flanged sleeve member is rotatably secured to said disc member by means of a retaining ring.

6. A process for the dynamic alignment of a winding device of the ring and traveler type, said process comprising ascertaining the deviation from the perpendicular of a spindle member by means of dynamically obscurable markings disposed on the face of a ring fitted disc axially disposed on said spindle member.

7. The process of claim 6 wherein said dynamic alignment is made at the bottom of the traverse cycle of said downtwister.

8. The process of claim 6 wherein said dynamic alignment is made at the top of the traverse cycle of said downtwister.

9. The process of claim 6 wherein said dynamic alignment is made at the top and at the bottom of the traverse cycle of said downtwister.

10. The process of claim 6 wherein said dynamic alignment is made at the top of the traverse cycle simultaneous to alignment of the spindle to a balloon guide.

References Cited

UNITED STATES PATENTS

| | | | |
|---|---|---|---|
| 2,885,773 | 5/1959 | Molinaro | 29—407 |
| 3,077,030 | 2/1963 | Carlson | 29—407 |
| 3,207,557 | 9/1965 | Hunter | 29—406 X |
| 3,209,434 | 10/1965 | Anderson | 29—404 X |

FOREIGN PATENTS 119,933  10/1918  Great Britain.

THOMAS H. EAGER, *Primary Examiner.*